United States Patent [19]

Maruyama et al.

[11] 3,917,598

[45] Nov. 4, 1975

[54] N-(ORTHO-ALKOXY-PHENYL)-N'-ANILINO-PROPYL-PIPERAZINES

[75] Inventors: Isamu Maruyama, Minoo; Masaru Nakao, Osaka; Kikuo Sasajima, Toyonaka; Shigeho Inaba, Takakazuka; Hisao Yamamoto, Nishinomiya, all of Japan

[73] Assignee: Sumitomo Chemical Company, Limited, Osaka, Japan

[22] Filed: Feb. 5, 1974

[21] Appl. No.: 439,827

[30] Foreign Application Priority Data

Feb. 5, 1973 Japan............... 48-15025

[52] U.S. Cl. ............ 260/268 PH; 260/293.66; 260/293.77; 260/293.79; 424/250
[51] Int. Cl.² .................................. C07D 295/12
[58] Field of Search ..... 260/268 PH, 293.66, 293.6, 260/293.77, 293.79

[56] References Cited
UNITED STATES PATENTS
2,679,481  5/1954  Norris et al................ 260/268 PH FOREIGN PATENTS OR APPLICATIONS
765,989  1/1957  United Kingdom OTHER PUBLICATIONS
Janssen Pharmaceutica N.V. Chemical Abstracts, Vol. 64, pp. 12704–12706 (1966).
Bach et al., J. Am. Chem. Soc. Vol. 79, pp. 2221–2225 (1957).

Primary Examiner—Raymond V. Rush
Assistant Examiner—Jose Tovar
Attorney, Agent, or Firm—Stewart and Kolasch, Ltd.

[57] ABSTRACT

An N-(ω-amino)alkylaniline derivative of the formula:

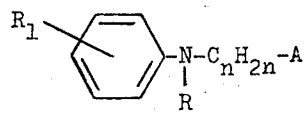

and its pharmaceutically acceptable salts, which are useful as neuroleptic agents are prepared by reacting a compound of the formula:

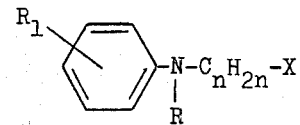

with a compound of the formula:

H—A wherein R is hydrogen, $C_1$–$C_7$ alkyl, $C_1$–$C_7$ alkanoyl or aroyl, $R_1$ is hydrogen, halogen, $C_1$–$C_7$ alkyl or $C_1$–$C_7$ alkoxy, A is

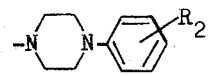

(wherein $R_2$ is hydrogen, halogen, $C_1$–$C_7$ alkyl, $C_1$–$C_7$ alkoxy or trifluoromethyl),

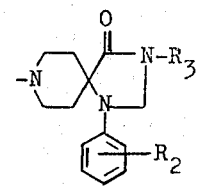

(wherein $R_2$ is as defined above and $R_3$ is hydrogen, $C_1$–$C_7$ alkyl or $C_1$–$C_7$ alkanoyl),

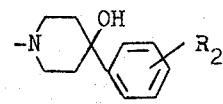

(wherein $R_2$ is as defined above or

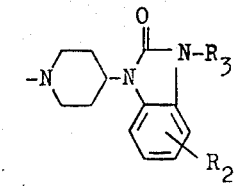

(wherein $R_2$ and $R_3$ are each as defined above) and $n$ is 2, 3 or 4.

9 Claims, No Drawings

N-(ORTHO-ALKOXY-PHENYL)-N'-ANILINO-PROPYL-PIPERAZINES

The present invention relates to novel N-(ω-amino)-alkylaniline derivatives, and their preparation and use. More particularly, it relates to novel N-(ω-amino)alkylaniline derivatives represented by the formula:

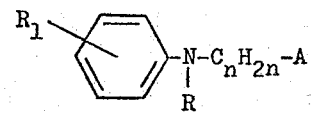   [I]

wherein R is hydrogen, $C_1$–$C_7$ alkyl, $C_1$–$C_7$ alkanoyl or aroyl, $R_1$ is hydrogen, halogen, $C_1$–$C_7$ alkyl or $C_1$–$C_7$ alkoxy, A is

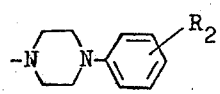

(wherein $R_2$ is hydrogen, halogen, $C_1$–$C_7$ alkyl, $C_1$–$C_7$ alkoxy or trifluoromethyl),

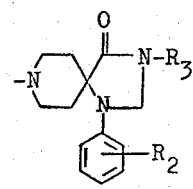

(wherein $R_2$ is as defined above and $R_3$ is hydrogen, $C_1$–$C_7$ alkyl or $C_1$–$C_7$ alkanoyl),

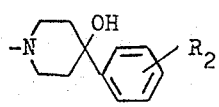

(wherein $R_2$ is as defined above), or

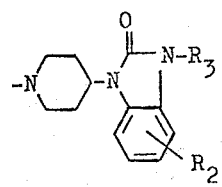

(wherein $R_2$ and $R_3$ are each as defined above) and $n$ is 2, 3 or 4, and their pharmaceutically acceptable salts, pharmaceutical compositions comprising them with pharmaceutically acceptable carriers, and processes for preparing them.

As used herein, the terms "$C_1$–$C_7$ alkyl", "$C_1$–$C_7$ alkoxy" and "$C_1$–$C_7$ alkanoyl" means such groups containing from one to seven carbon atoms which can be either straight or branched. Thus, the $C_1$–$C_7$ alkyl group represents, for example, methyl, ethyl, n-propyl, isopropyl, n-butyl, isobutyl, n-hexyl and the like; the $C_1$–$C_7$ alkoxy group represents, for example, methoxy, ethoxy, n-propoxy, isopropoxy, n-butoxy, isobutoxy, sec.-butoxy, n-pentoxy and the like; and the $C_1$–$C_7$ alkanoyl group represents, for example, formyl, acetyl, propionyl, n-butyryl, 6-methylhexanoyl and the like. The term "halogen" includes all four halogens, i.e. iodine, bromine, chlorine and fluorine. The term "aroyl" means, for example, benzoyl, halobenzoyl, nicotinoyl and the like.

The group of the formula: —$C_nH_{2n}$— represents a straight chain or branched chain alkylene group having up to 4 carbon atoms and includes, for example, ethylene, trimethylene, 1-methyltrimethylene, 2-methyltrimethylene and tetramethylene.

The N-(ω-amino)alkylaniline derivatives [I] form pharmaceutically acceptable salts with a variety of inorganic and organic acids such as sulfuric, phosphoric, hydrochloric, hydrobromic, nitric, oxalic, malonic, succinic, lactic, tartaric, maleic, fumaric, formic, acetic, salicyclic and p-toluenesulfonic acids.

The preferable class of the N-(ω-amino)alkylaniline derivative [I] is the compound of the formula:

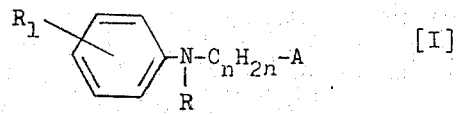   [I]

wherein $n$, R and $R_1$ are as defined above and A is

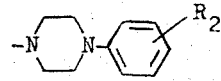

(wherein $R_2$ is as defined above) or

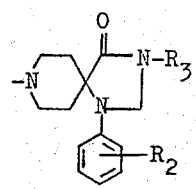

(wherein $R_2$ and $R_3$ are each as defined above), and its pharmaceutically acceptable salts. The particularly preferable class is the compound of the formula:

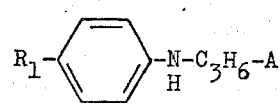

wherein $R_1$ is fluorine, methyl or methoxy and A is

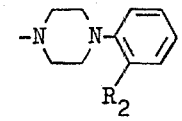

(wherein $R_2$ is $C_1$–$C_3$ alkoxy) or

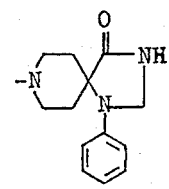

and its pharmaceutically acceptable salts. However, these classes do not limit the present invention.

As the result of an extensive study seeking excellent neuroleptic agents, it has been found that the novel N-(ω-amino)alkylaniline derivatives [I] show a depressant effect on the central nervous system and are useful as neuroleptic agents.

The depressant effect on the central nervous system can be determined by a conventional test method. For instance, the anti-apomorphine test establishes the remarkable excellence of the N-(ω-amino)alkylaniline derivative [I] wherein $n$ R and $R_1$ are each as defined above and A is

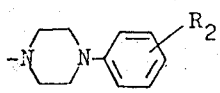

(wherein $R_2$ is as defined above) or

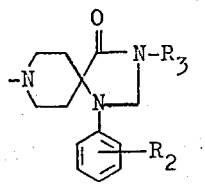

(wherein $R_2$ and $R_3$ are each as defined above), and its pharmaceutically acceptable salts.

The N-(ω-amino)alkylaniline derivatives [I] and their pharmaceutically acceptable salts can be administered orally in conventional dosage forms such as a tablet, capsule, solution, suspension, elixir or the like.

A typical tablet may be constituted from 1 to 20 percent by weight of a binder (e.g. tragacanth), from 1 to 20 percent by weight of a lubricant (e.g. talcum, magnesium stearate), an average dose of the active ingredient and q.s. 100 percent by weight of a filler (e.g. lactose). The usual oral dosage is 1 to 1000 mg per day.

Accordingly, a basic object of the present invention is to provide novel N-(ω-amino)alkylaniline derivatives [I] and their pharmaceutically acceptable salts which have excellent pharmacological properties. Another object of this invention is to provide processes for producing such novel and useful N-(ω-amino)alkylaniline derivstives [I] and their salts. A further object of the invention is to provide pharmaceutical compositions comprising such novel and useful N-(ω-amino)alkylaniline derivatives [I] or their salts. These and other objects of the invention will be apparent from the following descriptions.

According to the present invention, the novel N-(ω-amino)alkylaniline derivatives [I] can be prepared by reacting a compound of the formula:

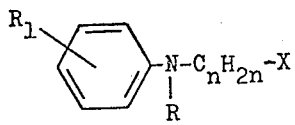 [II]

wherein R, $R_1$ and n are each as defined above and X is halogen (preferably chlorine, bromine or iodine) with a compound of the formula:

H—A [III]

wherein A is as defined above.

The reaction may be carried out in the absence or presence of an acid acceptor in an inert organic solvent (e.g. benzene, toluene, xylene, dimethylformamide, pyridine, methanol, ethanol) at a temperature from about room temperature to the boiling temperature of the solvent used. Suitable acid acceptors include sodium carbonate, potassium carbonate, sodium bicarbonate, potassium bicarbonate, sodium hydroxide, potassium hydroxide, sodium hydride, potassium hydride, triethylamine, etc.

The N-(ω-amino)alkylaniline derivatives [I], wherein R is hydrogen, can also be prepared by reducing a compound of the formula:

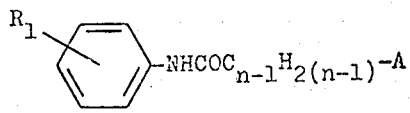

[IV]

wherein $R_1$, A and n are each as defined above with a reducing agent such as lithium aluminium hydride.

The reduction may be carried out at a cooling temperature, room temperature or an elevated temperature in the presence of a solvent or solvent mixture. Examples of the suitable solvent include ether, tetrahydrofuran, dioxane, N-ethylmorpholine and the like.

The compound [IV] can be easily prepared in a conventional procedure according to the following reaction scheme:

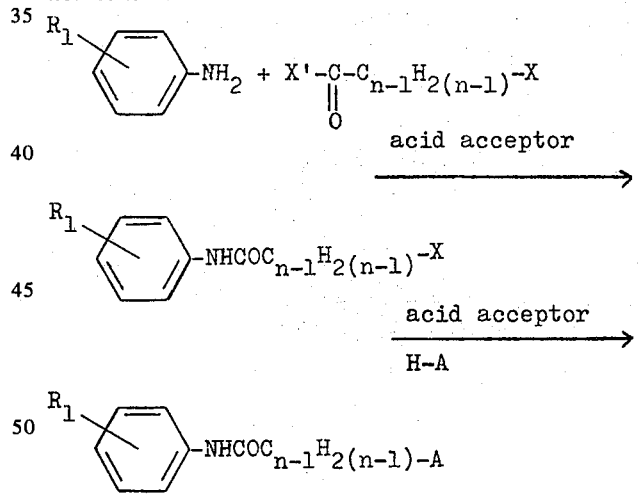

wherein $R_1$, A, n, X and X' are each as defined above.

The present invention is further disclosed in the following examples of more preferred embodiments thereof, which are presented for the purpose of illustration and it is not intended to limit the scope of the invention.

EXAMPLE 1

A mixture of 1.9 g of N-(3-chloropropyl)-p-fluoroaniline, 1.9 g of 1-(o-methoxyphenyl)piperazine, 0.5 g of sodium carbonate and 50 ml of dimethylformamide was heated at 80°–90°C for 15 hours. After cooling, the reaction mixture was poured into water and extracted with benzene. The extract was washed with water, dried over sodium sulfate and evaporated under reduced pressure to give 1-{3-(p-fluoroanilino)propyl}-

4-(o-methoxyphenyl)piperazine, m.p. 79°–80°C; recrystallized from cyclohexane, m.p. 84°–84.5°C.

The following compounds were obtained in the same manner as above:

1-{3-(p-Fluoroanilino)propyl}-4-(o-ethoxyphenyl)-piperazine; m.p. 101°–101.5°C;

1-{3-(p-Fluoroanilino)propyl}-4-(o-n-propoxyphenyl)piperazine, m.p. 76°–77°C;

1-{3-(p-Fluoroanilino)propyl}-4-(o-isopropoxyphenyl)piperazine, m.p. 79°–80°C;

1-{3-(p-Toluidino)propyl}-4-(o-methoxyphenyl)piperazine, m.p. 72°–73°C;

1-{3-(p-Ethylanilino)propyl}-4-(o-ethoxyphenyl)-piperazine dihydrochloride, m.p. 98°–99°C (decomposition);

1-{3-(p-Anisidino)propyl}-4-(o-methoxyphenyl)piperazine, m.p. 82°–82.5°C;

1-{3-(p-Fluoroanilino)propyl}-4-(o-chlorophenyl)-piperazine dihydrochloride, m.p. > 240°C;

1-{3-(p-Fluoroanilino)propyl}-4-(o-tolyl)piperazine dihydrochloride, m.p. > 240°C;

1{3-(p-Chloroanilino)propyl}-4-(o-ethoxyphenyl)-piperazine, m.p. 90°–91°C;

1-{2-(p-Fluoroanilino)ethyl}-4-(o-methoxyphenyl)-piperazine dihydrochloride, m.p. 199°–200°C (decomposition);

1-{4-(p-Fluoroanilino)butyl}-4-(o-methoxyphenyl)-piperazine oxalate, m.p. 100°–101°C (decomposition);

1-{3-(m-Fluoroanilino)propyl}-4-(o-methoxyphenyl)piperazine dihydrochloride, m.p. 227°–228°C (decomposition);

1-{3-(o-Fluoroanilino)propyl}-4-(o-methoxyphenyl)piperazine dihydrochloride, m.p. 203°–204°C (decomposition);

1-{3-(p-Fluoro-N-propionylanilino)propyl}-4-(o-methoxyphenyl)piperazine, m.p. 113°–113.5°C;

1-{3-[N-(p-Fluorobenzoyl)-p-fluoroanilino]propyl}-4-(o-methoxyphenyl)piperazine dihydrochloride, m.p. 200°–201°C (decomposition);

8-{3-(p-Fluoroanilino)propyl}-1-phenyl-4-oxo-1,3,8-triazaspiro[4,5]decane, m.p. 177°–178°C;

8-{3-(p-Anisidino)propyl}-1-phenyl-4-oxo-1,3,8-triazaspiro[4,5]decane, m.p. 165°–166°C;

1-Phenyl-8-{3-(p-toluidino)propyl}-4-oxo-1,3,8-triazaspiro[4,5]decane, m.p. 194°–195°C;

4-(p-Chlorophenyl)-1-{3-(p-fluoroanilino)propyl}-4-piperidinol, m.p. 144°–144.5°C;

1-{3-(N-Acetyl-p-fluoroanilino)propyl}-4-(p-chlorophenyl)-4-piperidinol, m.p. 151°–151.5°C;

1-{3-(p-Fluoroanilino)propyl}-4-(2-oxo-1-benzimidazonyl)piperidine, m.p. 103°–104°C.

EXAMPLE 2

To a mixture of 4 g of lithium aluminum hydride and 40 ml of tetrahydrofuran was added portionwise 2 g of 8-{2-[N-(p-fluorophenyl)carbamoyl]ethyl}-1-phenyl-4-oxo-1,3,8-triazaspiro[4,5]decane under cooling. Then, the mixture was heated under reflux for 4 hours. To the reaction mixture were gradually added water and benzene under cooling, and the precipitate was filtered off. The organic layer was separated, dried over sodium sulfate and evaporated under reduced pressure. The residue was triturated with ether, cooled and filtered to give 8-{3-(p-fluoroanilino)propyl}-1-phenyl-4-oxo-1,3,8-triazaspiro[4,5]decane, m.p. 158°–162°C; recrystallized from benzene, m.p. 177°–178°C.

What is claimed is:

1. A compound of the formula:

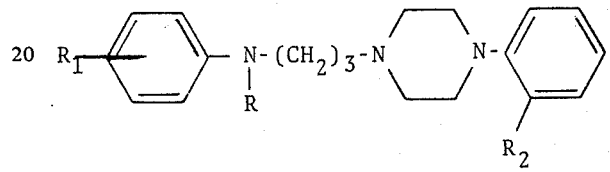

wherein R is hydrogen or ethyl, $R_1$ is fluorine, chlorine, methyl or methoxy and $R_2$ is $C_1$–$C_3$ alkoxy, or non-toxic pharmaceutically acceptable acid addition salts thereof.

2. A compound of the formula:

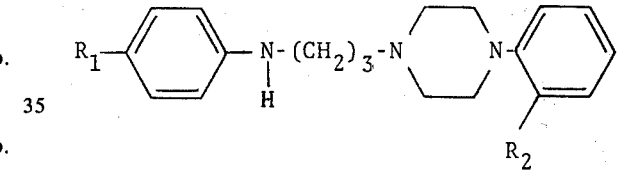

wherein $R_1$ is fluorine, chlorine, methyl or methoxy and $R_2$ is $C_1$–$C_3$ alkoxy, or non-toxic pharmaceutically acceptable acid addition salts thereof.

3. The compound according to claim 2 wherein $R_1$ is fluorine and $R_2$ is methoxy.

4. The compound according to claim 2, wherein $R_1$ is fluorine and $R_2$ is ethoxy.

5. The compound according to claim 2, wherein $R_1$ is fluorine and $R_2$ is n-propoxy.

6. The compound according to claim 2, wherein $R_1$ is fluorine and $R_2$ is isopropoxy.

7. The compound according to claim 2, wherein $R_1$ is methyl and $R_2$ is methoxy.

8. The compound according to claim 2, wherein $R_1$ is methoxy and $R_2$ is methoxy.

9. The compound according to claim 2, wherein $R_1$ is chlorine and $R_2$ is ethoxy.

* * * * *